United States Patent

Orloff

[15] 3,655,227
[45] Apr. 11, 1972

[54] TENSION STRESSED STRUCTURE
[72] Inventor: John F. Orloff, Mt. Clemens, Mich.
[73] Assignee: Huck Manufacturing Company, Detroit, Mich.
[22] Filed: Sept. 22, 1969
[21] Appl. No.: 859,786

[52] U.S. Cl...............................287/189.36F, 151/2, 151/37
[51] Int. Cl.............................................................F16b 39/02
[58] Field of Search.................151/2, 3, 14.5, 30, 14, 14 DW; 85/62; 287/189.36 F

[56] References Cited

UNITED STATES PATENTS

| | | | |
|---|---|---|---|
| 715,891 | 12/1902 | Somerby | 151/14.5 |
| 924,467 | 6/1909 | Humphrey | 151/3 |
| 1,016,746 | 2/1912 | Herzog | 151/14.5 |
| 3,421,562 | 1/1969 | Orloff et al. | 151/2 |
| 3,440,922 | 4/1969 | Cohen | 151/2 |

Primary Examiner—Edward C. Allen
Attorney—Harness, Dickey & Pierce

[57] ABSTRACT

An improved multi-part fastener for a stressed structure comprising a bolt, a special nut, and an intermediate bushing like element assembled with the bushing between the nut and the opposite end of the bolt, which is applied by crimping the bushing to effect an elongation thereof into an interlocking relationship with the bolt and the nut and also where the bushing is of a softer material than the nut which gives longer life to the installation tool while at the same time maintaining the predictably uniform and high clamping force of the fastening.

1 Claim, 7 Drawing Figures

Patented April 11, 1972
3,655,227
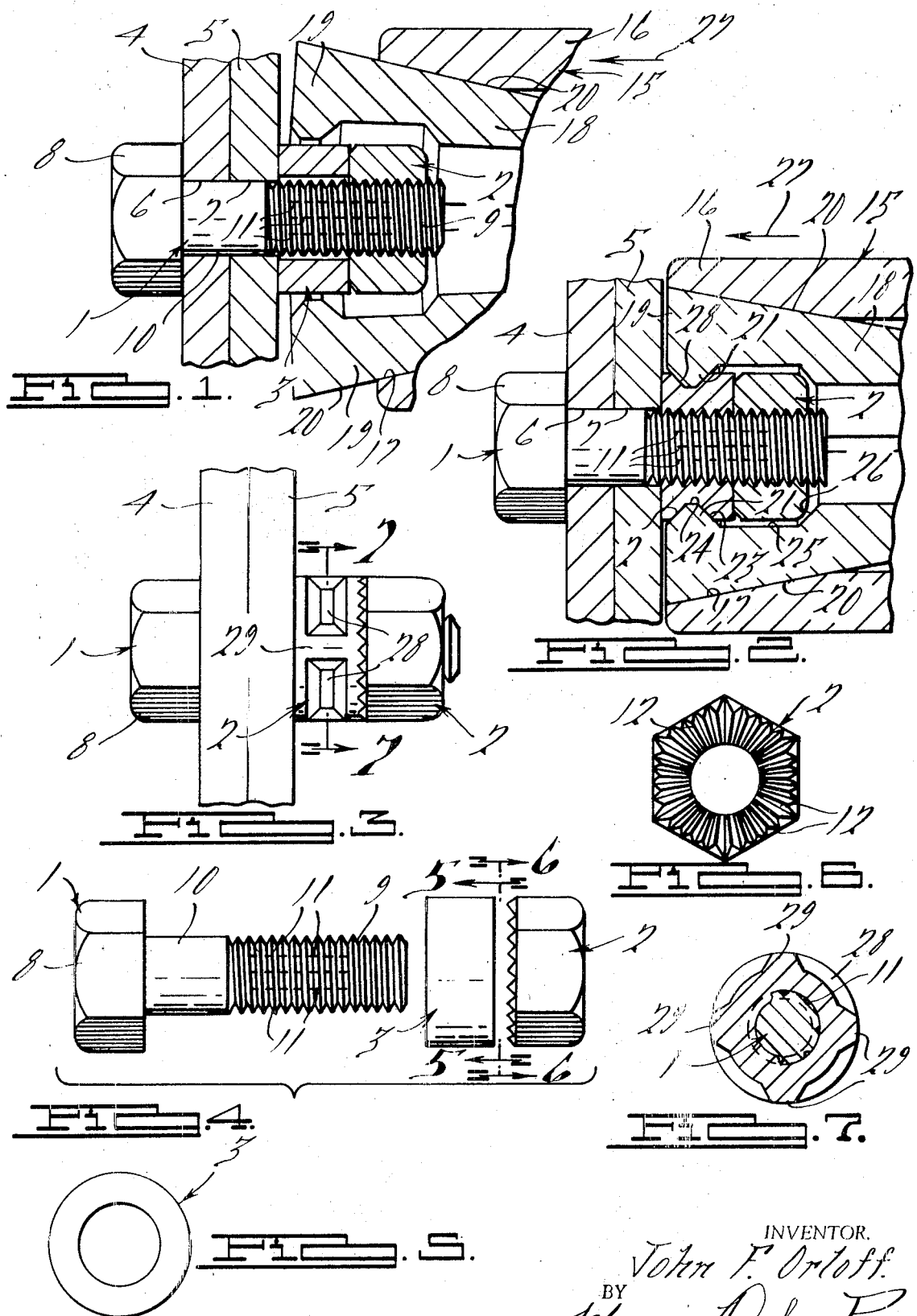

TENSION STRESSED STRUCTURE

The present invention relates to an improved fastener and structural unit in which a plurality of overlapping members having aligned openings are secured together by a unique fastening means including a bolt or pin, a special nut and a bushing of softer material than the nut by a unique method which produces a stressed structural unit with the bolt under high residual tension.

In general, the present invention relates to the type of fastener and joint disclosed in U.S. Pat. No. 3,421,562. The present invention accomplishes the same predictably uniform and high clamp force as that of the patent referred to but in such a manner as to materially increase the life of the installation tools.

The terms residual tension, retained tension, preload and clamping force are used here interchangeably to describe the tension in the pin or bolt of the fastener produced in the setting of the fastener and which remains after the fastener is set. The residual tension produces advantages including a tight and rigid joint, high fatigue life and the ability to withstand higher tensile loads without failure.

The structure of the present invention includes a bolt or pin, a nut and a bushing. The nut is preferably a conventional serrated nut of standard hardness and the bushing is of a material softer than the nut and softer than the bolt. The bolt as disposed through openings of the structural members with the threaded stem projecting therethrough and therebeyond in the usual way. The threads of the nut are preferably formed with longitudinal serrations for the purpose of providing an interlock with high break-away torque required between the pin and the bushing. The bushing is disposed onto the bolt abutting the adjacent face of the structural member and overlying the threaded and serrated portion of the bolt. The nut is threaded onto the end of the bolt with the radial and serrated teeth of the nut abutting the adjacent end of the bushing. The nut is a hexed nut in the embodiment described and the outside diameter of the bushing is substantially the same as that of the nut.

The fastener is applied by torquing the nut onto the bolt at a relatively low torque so as to pull the sheets together, if they are separate, and to remove the looseness from the joint. A crimping tool is then applied which includes fingers positioned over the bushing and crimped inwardly to effect an elongation of the bushing. Such elongation causes the serrated teeth of the nut to be impressed into the adjacent edge of the bushing and causes the bushing to be impressed into the threads and serrations of the bolt. At the same time the bushing is caused to elongate; and since the nut is fixed relative to the pin by the threaded connection therebetween, this elongation of the collar places the pin under a high tension which results in a high tensile preload or high residual tension in the set fastener. Also, the impression of the collar into the serrated teeth and into the serrations and threads of the bolt affects an interlock between the nut and the bolt turning the free-running nut into a locked nut and providing a high break-away torque so that the nut will not become inadvertently loosened in use.

In the crimping of the prior art fastener, that portion of the nut which is crimped is integral with the threaded portion of the nut and is of the same hardness. The nut must have the required hardness to provide the required strength in the fastener and consequently the crimping loads are quite high to effect the crimping and elongation of the nut. By the present invention, the high strength and integrity of the fastener is maintained by using a nut of standard hardness and the life of the crimping tool may be effectively increased because the crimping loads are less when used on the softer bushing.

The primary object of the present invention is thus to provide an improved fastener and stressed structure which with relatively low torque applications accomplishes a high predictable uniform residual tension or clamping force at lower crimping loads than previously necessary.

Other object of the invention will become apparent from the following specifications and drawings relating thereto and from the claims hereinafter set forth.

FIG. 1 is a cross-sectional view showing the fastened parts in place and showing the crimping tool in position prior to the crimping;

FIG. 2 is a view similar to FIG. 1 with the crimping tool shown at the completion of the crimping operation;

FIG. 3 is a reduced elevational view similar to FIG. 2 with the crimping tool removed;

FIG. 4 is a separated elevational view of the fastener parts;

FIG. 5 is an end elevational view of the bushing taken along the line 5—5 of FIG. 4;

FIG. 6 is an end elevational view of the nut taken along the line 6—6 of FIG. 4; and FIG. 7 is a cross-sectional view taken along the line 7—7 of FIG. 3.

Referring to the drawings, the preferred embodiment is illustrated and comprises a bolt or pin generally indicated at 1, a nut generally indicated at 2 and a bushing generally indicated at 3. A pair of overlapping structural or panel members are shown at 4 and 5 having aligned openings 6 and 7, respectively, therethrough.

The bolt 1 has an integral head 8 and peripheral grooves in the form of spiral screw threads 9 in the projecting stem portion at the opposite end and an intermediate smooth shank 10. The bolt projects through the aligned openings 5 and 6 and the smooth shank portion 10 may fit into the openings 6 and 7 with an interference fit, if desired. Also, if desired, the openings 6 and 7 could be tapered to form concentric openings, and the shank pull 10 would be correspondingly tapered for an interference fit.

The projecting portion of the pin has screw threads 9 and preferably longitudinally extending serrations 11 are formed spaced around the pin particularly adjacent the inner ends of the threads.

The nut 2 is a free-running nut and is of the type known as a serrated tooth nut. Radially extending serrations 12 are formed in one face of the nut and such nut is hexagonal in form in the embodiment illustrated.

The bushing 3 is a smooth cylindrical bushing of a hardness softer than that of the nut and pin. The nut and pin may be of any suitable metal or of a plastic material and the bushing may also be of a metal or suitable plastic material but must be capable of being permanently deformed so that upon such deformation it is caused to elongate.

With the fastener parts in the position shown in FIG. 1, the bushing is first applied over the threaded end 9 of the bolt 1 against the adjacent face of the panel 5. The free-run nut 2 is then torqued onto the threaded end of the bolt to such an extent as to pull the sheets 4 and 5 together, if necessary, and to take the looseness out of the joint.

The threaded portion 9, including the serrations 10 are of such length as to accommodate variations in grip, the structure being illustrated in normal grip.

The initial low torque is applied, and may merely be finger tight in many instances, and the final tension on the bolt or the clamping force is accomplished by crimping the bushing so that the bushing is impressed into the underlying threads 9 and serrations 11 which locks the bushing against rotation with respect to the bolt and the bushing is also impressed into the serrations 12 of the nut to effect an interlock between the bushing and the nut, resulting in an interlock through the bushing 3 between the nut 2 and the bolt 1.

The crimping tool is generally indicated at 15 and is shown in FIG. 1 as embracing the nut 2 and the bushing 3 and also embracing the projecting end of the bolt 1. Crimping tool 15 is known and forms no part of the present invention as a tool per se. An example of such tool is disclosed in U.S. Pat. No. 3,029,665. It comprises an outer annular member or barrel 16 having a tapered circular mouth 17. A tubular crimping collet 18 is disposed within the annular member 16 and has four resilient fingers or jaws 19, each of which is of an arcuate width corresponding to substantially one-fourth of the circumference of the collet. These jaws 19 have tapered outer surfaces 20 complimentary to the tapered annular surface 17.

The fingers 19 have arcuate projections 21 extending thereacross, which are formed by angular side walls 22 and 23 and terminate in flat arcuate surfaces 24. In the embodiment illustrated, the included angle between the surfaces 22 and 23 is substantially 60°.

Each of the fingers also includes intermediate straight portion 25 terminating in an annular shoulder 26.

Motion is imparted to the crimping tool so that a relative motion is imparted to the collet 18 and the outer barrel member 16 and so that the member 16 moves in the direction of the arrow 27. By the co-action between the tapered surfaces 17 and 20, the resilient fingers 19 are caused to move radially inwardly so that the projections 21 are impressed into the metal of the bushing 3 and crimp the metal of the bushing as shown in FIGS. 2 and 3 to permanently form impressions around the metal in the bushing 3 as indicated at 28 in FIGS. 2 and 3. Such depressions are separated by longitudinally extending 182 integral fins or walls 29. In the embodiment of the crimping tool illustrated during this crimp action, the tapered portions 26 on the fingers 19 engage the complementary end of the nut 2 which longitudinally locates the projections of the fingers 19 with respect to the bushing. During the crimping, additional threads in bearing are produced as the bushing is impressed into the pin as shown in FIG. 2. Thus, the tensile value of the fastening is increased, as well as the uniform clamping force and interlock produced.

The crimping tool is removed and the finally set fastener is that shown in FIG. 3.

Since the bushing 3 is of a softer material than the nut 2 substantially less crimping force is required resulting in substantially less crimping loads on the fingers 19 materially increasing their lives. This is particularly significant in the larger sizes of one-half inch and above.

While preferred embodiments of the invention have been shown and described, it will be understood that various changes and modifications may be made without departing from the spirit of the invention.

What is claimed is:

1. An assembled joint including a plurality of overlying members having aligned openings therein, an improved multi-part tension stressed fastening means joining said members together comprising a pin, a bushing and a nut, said pin having a shank extending through said openings with the shank projecting beyond the outer surface of one of said members, means holding the pin against movement through said openings in the direction of said last named outer surface, the projecting end of the pin having a grooved portion, the outer end of the grooved portion being threaded, a bushing disposed over said grooved portion, a nut threaded on said threaded portion abutting said bushing, said bushing being of a softer material than said nut, said bushing being crimped radially inwardly to form and as formed having a plurality of permanent radially inwardly extending, circumferentially spaced indentations in the radially outer surface of said bushing with the material from said indentations of said bushing having been deformed into contact with the underlying grooved portion and to effect an elongation of the bushing axially of the pin against the abutting face of said nut to thereby impart a residual tension in said pin, said nut having serrated-like irregularities extending at least partially radially in the face abutting said bushing and said grooved portion in said pin under said bushing having longitudinally extending serrations formed therein, said bushing engaging said irregularities and said serrations whereby an interlock is effected between said nut, said bushing and said pin.

* * * * *